US012665401B2

(12) United States Patent
Wang

(10) Patent No.: US 12,665,401 B2
(45) Date of Patent: Jun. 23, 2026

(54) SHIELDING CONNECTION ASSEMBLY, CABLE ASSEMBLY AND METHOD FOR PREPARING CABLE ASSEMBLY

(71) Applicant: Changchun Jetty Automotive Technology Co., Ltd., Changchun (CN)

(72) Inventor: Chao Wang, Changchun (CN)

(73) Assignee: CHANGCHUN JETTY AUTOMOTIVE TECHNOLOGY CO., LTD., Jilin (CN)

(*) Notice: Subject to any disclaimer, the term of this patent is extended or adjusted under 35 U.S.C. 154(b) by 150 days.

(21) Appl. No.: 18/549,810

(22) PCT Filed: Jan. 19, 2022

(86) PCT No.: PCT/CN2022/072661
§ 371 (c)(1),
(2) Date: Sep. 8, 2023

(87) PCT Pub. No.: WO2022/188556
PCT Pub. Date: Sep. 15, 2022

(65) Prior Publication Data
US 2024/0154393 A1 May 9, 2024

(30) Foreign Application Priority Data
Mar. 12, 2021 (CN) .......................... 202110272612.6

(51) Int. Cl.
*H02G 1/14* (2006.01)
*H02G 15/08* (2006.01)

(52) U.S. Cl.
CPC ............... *H02G 1/14* (2013.01); *H02G 15/08* (2013.01)

(58) Field of Classification Search
CPC .......... H02G 1/14; H02G 15/08; H02G 15/18; H01R 4/02; H01R 4/10; H01R 4/18;
(Continued)

(56) References Cited

U.S. PATENT DOCUMENTS 3,859,455 A * 1/1975 Gommans ............ H01R 9/0503
174/92
3,872,237 A * 3/1975 Eyre .................... H02G 15/085
174/92
(Continued)

FOREIGN PATENT DOCUMENTS

CN 101060206 A 10/2007
CN 201378723 Y 1/2010
(Continued)

OTHER PUBLICATIONS

Extended Search Report for corresponding European Patent Application No. 22766083.4, dated Jul. 23, 2024, 12 pages.
(Continued)

*Primary Examiner* — William H. Mayo, III
(74) *Attorney, Agent, or Firm* — LOZA & LOZA, LLP; Michael F. Fedrick

(57) ABSTRACT
A shielding connection assembly, a cable assembly and a method for preparing a cable assembly. The shielding connection assembly includes: an conductive device having a first end connected to the first shielding layer and a second end connected to the second shielding layer; a first shielding internal device disposed on an inner side of the first shielding layer; a first shielding external device disposed on an outer side of the first end; a second shielding internal device disposed on an inner side of the second shielding layer; and a second shielding external device disposed on an outer side of the second end.

17 Claims, 5 Drawing Sheets

(58) Field of Classification Search
CPC .......... H01R 4/183; H01R 4/186; H01R 4/20;
H01R 4/62; H01R 4/70; H01R 9/0518;
H01R 9/07; H01R 43/048; H01B 7/0045;
H01B 7/18; H01B 7/28; H01B 7/282
USPC .............. 174/74 R–88 R; 439/578–585, 638,
439/650–655, 675, 877
See application file for complete search history.

(56) References Cited

U.S. PATENT DOCUMENTS

| | | | | |
|---|---|---|---|---|
| 11,316,287 | B2 * | 4/2022 | Tohyama ................. | H01R 4/20 |
| 2002/0040803 | A1 * | 4/2002 | Buyst ................... | H02G 15/105 |
| | | | | 174/88 R |
| 2018/0233893 | A1 * | 8/2018 | Adachi ................... | H01B 7/18 |

FOREIGN PATENT DOCUMENTS

| | | |
|---|---|---|
| CN | 108429022 A | 8/2018 |
| CN | 211351681 U | 8/2020 |
| CN | 112968416 A | 6/2021 |
| CN | 112968417 A | 6/2021 |
| JP | S54153267 U | 10/1979 |
| JP | 198075967 U | 5/1980 |
| JP | 1996088917 A | 4/1996 |
| JP | 2001231123 A | 8/2001 |
| JP | 2003284232 A | 10/2003 |
| JP | 2007110831 A | 4/2007 |
| JP | 2017017885 A | 1/2017 |
| JP | 2018133837 A | 8/2018 |

OTHER PUBLICATIONS

International Search Report for corresponding International Patent Application No. PCT/CN2022/072661, dated Mar. 16, 2022.
International Search Report for International Patent Application No. PCT/CN2022/072661, dated Mar. 16, 2022, 3 pages.
First Office Action for counterpart Chinese Patent Application No. 202110272612.6, dated Apr. 28, 2023, 8 pages.
Corresponding Japanese Patent Application No. 2023-554387, Office Action dated Nov. 19, 2024.
Office Action dated Apr. 4, 2025 for corresponding European Patent Application No. 22766083.4.
Office Action dated Sep. 22, 2025 for corresponding European Patent Application No. 22766083.4.

* cited by examiner

213

223

213

223

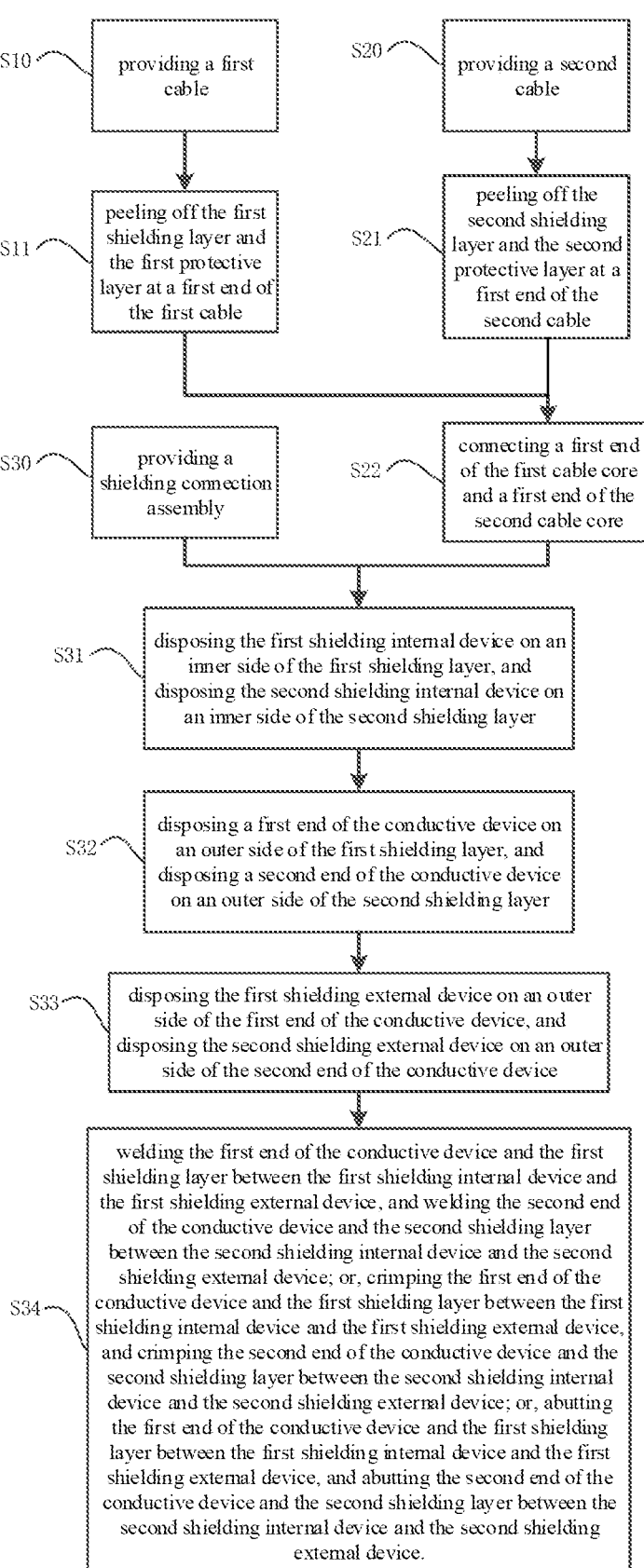

S10 — providing a first cable

S20 — providing a second cable

S11 — peeling off the first shielding layer and the first protective layer at a first end of the first cable S21 — peeling off the second shielding layer and the second protective layer at a first end of the second cable S30 — providing a shielding connection assembly S22 — connecting a first end of the first cable core and a first end of the second cable core S31 — disposing the first shielding internal device on an inner side of the first shielding layer, and disposing the second shielding internal device on an inner side of the second shielding layer S32 — disposing a first end of the conductive device on an outer side of the first shielding layer, and disposing a second end of the conductive device on an outer side of the second shielding layer S33 — disposing the first shielding external device on an outer side of the first end of the conductive device, and disposing the second shielding external device on an outer side of the second end of the conductive device S34 — welding the first end of the conductive device and the first shielding layer between the first shielding internal device and the first shielding external device, and welding the second end of the conductive device and the second shielding layer between the second shielding internal device and the second shielding external device; or, crimping the first end of the conductive device and the first shielding layer between the first shielding internal device and the first shielding external device, and crimping the second end of the conductive device and the second shielding layer between the second shielding internal device and the second shielding external device; or, abutting the first end of the conductive device and the first shielding layer between the first shielding internal device and the first shielding external device, and abutting the second end of the conductive device and the second shielding layer between the second shielding internal device and the second shielding external device.

FIG. 11

SHIELDING CONNECTION ASSEMBLY, CABLE ASSEMBLY AND METHOD FOR PREPARING CABLE ASSEMBLY

CROSS-REFERENCE TO RELATED APPLICATIONS

The present application is the U.S. national stage of International Patent Application No. PCT/CN2022/072661, filed on Jan. 19, 2022, which claims priority to Chinese Patent Application No. 202110272612.6, filed on Mar. 12, 2021, and entitled "Shielding connection assembly, cable assembly and method for preparing cable assembly," which is are hereby incorporated by reference in their entireties.

TECHNICAL FIELD

The present disclosure relates to the technical field of cables, and particularly to a shielding connection assembly, a cable assembly and a method for preparing a cable assembly.

BACKGROUND

With the continuous development and widespread application of the new energy technologies, more and more vehicles are using batteries as power sources. In a vehicle equipped with a battery, electric devices such as a motor and an on-board computer need to be connected to the battery through a cable, so that the electric energy in the battery can be transmitted to the electric devices through the cable to enable, the electric devices to play their respective functions. In practical applications, the cable used to connect the battery and the electrical devices is not a complete cable, but composed of a plurality of cables which are connected in sequence.

Specifically, the cable generally includes a cable core and a shielding net wrapped around an outer side of the cable core. The main function of the cable core is to transmit power. The main function of the shielding net is to provide a good shielding effect on the cable core, so as to prevent a current magnetic field of the cable core from generating electromagnetic interference on external electrical components.

At present, the shielding connection structure used to butt two cables is immature, resulting in failure to form a stable and effective connection between the shielding nets of the two cables at the butting position, which is not conducive to ensuring the electromagnetic shielding effect between the cable cores.

SUMMARY

The present disclosure provides a shielding connection assembly, a cable assembly and a method for preparing a cable assembly, which are capable of effectively improving the electromagnetic shielding effect between cables.

It is one aspect of the present disclosure to provide a shielding connection assembly for connecting a first shielding layer and a second shielding layer. The shielding connection assembly includes: a conductive device, a first shielding internal device, a first shielding external device, a second shielding internal device and a second shielding external device. The conductive device has a first end connected to the first shielding layer and a second end connected to the second shielding layer. The first shielding internal device is disposed on an inner side of the first shielding layer. The first shielding external device is disposed on an outer side of the first end. The first end of the conductive device and the first shielding layer are pressed or welded or abutted between the first shielding internal device and the first shielding external device. The second shielding internal device is disposed on an inner side of the second shielding layer. The second shielding external device is disposed on an outer side of the second end. The second end of the conductive device and the second shielding layer are pressed or welded or abutted between the second shielding internal device and the second shielding external device.

As an example, an inner wall of the conductive device is provided with an inner insulation layer; and the first end and the second end of the conductive device are not provided with the inner insulation layer. The inner insulation layer can well protect the inner side of the conductive device, thereby preventing the conductive device from being in conductive contact with other components inside the conductive device.

As an example, an outer wall of the conductive device is provided with an outer insulation layer; and the first end and the second end of the conductive device are not provided with the outer insulation layer. The outer insulation layer can well protect the outer side of the conductive device, thereby preventing the conductive device from being in conductive contact with other components outside the conductive device.

It is another aspect of the present disclosure to provide a cable assembly, which includes a first cable and a second cable, and further includes any shielding connection assembly aforementioned. The first cable includes a first cable core and a first shielding layer, and a first protective layer is wrapped around an outer side of the first cable, and the first shielding layer is disposed on an outer side of the first protective layer. The second cable includes a second cable core and a second shielding layer, a second protective layer is wrapped around an outer side of the second cable core, and the second shielding layer is disposed on an outer side of the second protective layer. A first end of the first cable core is connected to a first end of the second cable core.

In the cable assembly provided by the present disclosure, through the shielding connection assembly, the continuity of the electromagnetic shielding between the first cable and the second cable can be effectively ensured, and the connection strength between the first cable and the second cable can be effectively improved.

In order to improve the connection effect between the first cable core and the second cable core, a minimum cross-sectional area of a lapped or butted position between the first cable core and the second cable core may be greater than or equal to a smallest one of a cross-sectional area of the first cable core and a cross-sectional area of the second cable core, so as to avoid the cable resistance from being too large due to the small cross-sectional area of the lapped or butted position between the first cable core and the second cable core, thereby preventing the temperature rise value from exceeding the standard requirement when the current is applied.

As an example, the cable assembly further includes an isolation device, which is disposed on an outer side of the first end of the first cable core and on an outer side of the first end of the second cable core. The isolation device can well protect the first cable core and the second cable core which are exposed, so as to improve the safety thereof.

As an example, one end of the isolation device is connected to the first protective layer, and the other end of the isolation device is connected to the second protective layer. In this way, the first cable core and the second cable core can be hermetically protected, so that the safety thereof can be further improved. As an example, the first cable further includes a third protective layer, and the second cable further includes a fourth protective layer. The third protective layer is disposed on an outer side of the first shielding layer, and the fourth protective layer is disposed on an outer side of the second shielding layer.

The use safety and the structural strength of the first cable can be effectively improved by the third protective layer. Correspondingly, the use safety and the structural strength of the second cable can be effectively improved by the fourth protective layer.

As an example, when an outer wall of the conductive device is provided with an outer insulation layer, the cable assembly further includes a first sealing member and a second sealing member. The first sealing element is used for hermetically connecting the third protective layer and the outer insulation layer, and the second sealing element is used for hermetically connecting the fourth protective layer and the outer insulation layer, so as to effectively improve the impermeability of the connection position between the first cable and the second cable, and achieve good dustproof and waterproof effects.

It is still another aspect of the present disclosure to provide a method for preparing a cable assembly, including: providing a first cable, which includes a first cable core, a first protective layer and a first shielding layer, the first protective layer is disposed on an outer side of the first cable core, and the first shielding layer is disposed on an outer side of the first protective layer; peeling off the first shielding layer and the first protective layer at a first end of the first cable to expose the first cable core; providing a second cable, which includes a second cable core, a second protective layer and a second shielding layer, the second protective layer is disposed on an outer side of the second cable core, and the second shielding layer is disposed on an outer side of the second protective layer;

As an example, before the step of disposing an end of the conductive device on the outer side of the first shielding layer and disposing the other end of the conductive device on the outer side of the second shielding layer, the method further includes: disposing an isolation device on an outer side of a connection position between the first cable core and the second cable core.

The present disclosure achieves the following advantageous effects: in the shielding connection assembly provided by the present disclosure, the first shielding layer and the second shielding layer can be effectively connected through the conductive device, so as to ensure the electromagnetic shielding performance between the first shielding layer and the second shielding layer. In addition, through the first shielding internal device and the first shielding external device, the stable connection between the first shielding layer and the conductive device can be effectively ensured. Correspondingly, through the second shielding internal device and the second shielding external device, the stable connection between the second shielding layer and the conductive device can be effectively ensured.

BRIEF DESCRIPTION OF THE DRAWINGS

FIG. 11 illustrates a flowchart of a method for preparing a cable assembly according to an embodiment of the present disclosure.

REFERENCE NUMERALS

10—shielding connection assembly; 11—conductive device; 111—inner insulation layer; 112—outer insulation layer; 12—first shielding internal device; 13—first shielding external device; 14—second shielding internal device; 15—second shielding external device; 21—first cable; 211—first cable core; 212—first protective layer; 213—first shielding layer; 214—third protective layer; 22—second cable core; 221—second cable; 222—second protective layer; 223—second shielding layer; 224—fourth protective layer; 23—crimping ring; 24—isolation device; 25—first sealing member; 26—second sealing member.

DETAILED DESCRIPTION

For a better understanding of the technical features of the present disclosure by those skilled in the art, a detailed description of the embodiments of the present disclosure will be set forth with reference to the drawings.

Figures 1, 2:
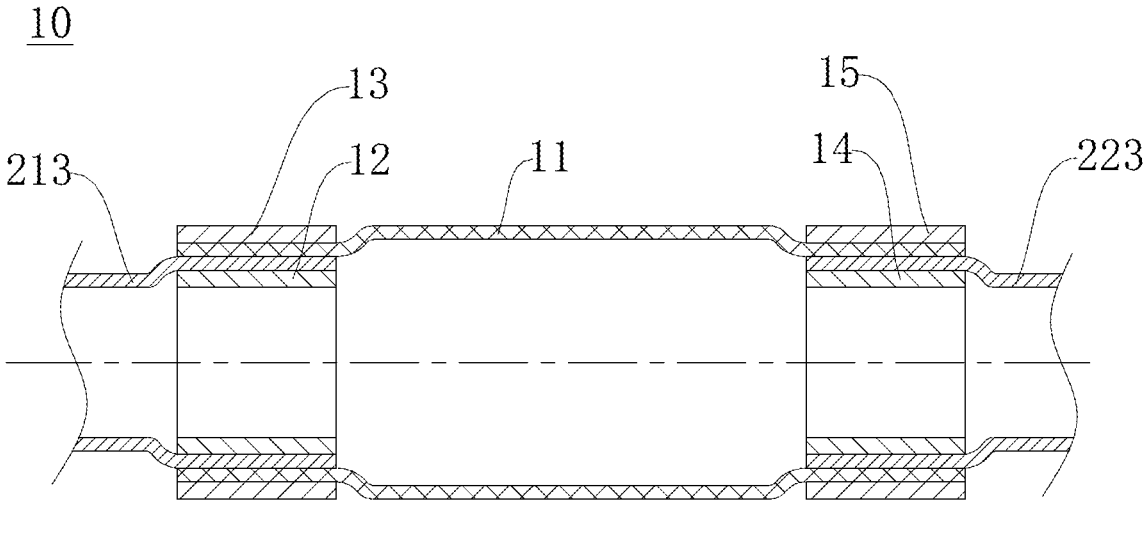
FIG. 1 illustrates a schematic diagram of a cross-sectional structure of a shielding connection assembly according to an embodiment of the present disclosure.
FIG. 2 illustrates a schematic diagram of a cross-sectional structure of another shielding connection assembly according to an embodiment of the present disclosure.

As illustrated in FIG. 1, an embodiment of the present disclosure provides a shielding connection assembly 10 for connecting a first shielding layer 213 and a second shielding layer 223.

The shielding connection assembly 10 includes a conductive device 11, a first shielding internal device 12, a first shielding external device 13, a second shielding internal device 14 and a second shielding external device 15.

Specifically, a first end (a left end in the figure) of the conductive device 11 is disposed on an outer side of the first shielding layer 213, and an inner wall of the conductive device 11 is in conductive contact with an outer wall of the first shielding layer 213. A second end (a right end in the figure) of the conductive device 11 is disposed on an outer side of the second shielding layer 223, and an inner wall of the conductive device 11 is in conductive contact with an outer wall of the second shielding layer 223. Therefore, the first shielding layer 213 and the second shielding layer 223 can be electrically connected through the conductive device 11, so as to ensure the continuity of electromagnetic shielding between the first shielding layer 213 and the second shielding layer 223.

In order to improve the connection effect between the conductive device 11 and the first shielding layer 213 and the second shielding layer 223, in an embodiment provided by the present disclosure, the left end of the conductive device 11 is fixedly connected to the first shielding layer 213 through the first shielding internal device 12 and the first shielding external device 13, and the right end of the conductive device 11 is fixedly connected to the second shielding layer 223 through the second shielding internal device 14 and the second shielding external device 15.

Specifically, the first shielding internal device 12 is disposed on an inner side of the first shielding layer 213, and the first shielding external device 13 is disposed on an outer side of the conductive device 11. A certain force is exerted on the first shielding external device 13 using a tool such as a crimping plier, so that the first shielding external device 13 is deformed inward. Meanwhile, since the first shielding internal device 12 has a certain structural strength, a certain stress can be maintained between the first shielding external device 13 and the first shielding internal device 12, so that the first shielding layer 213 and the left end of the conductive device 11 are pressed between the first shielding external device 13 and the first shielding internal device 12. Alternatively, the first shielding layer 213 and the left end of the conductive device 11 may be welded between the first shielding internal device 12 and the first shielding external device 13 by abutment, laser welding, ultrasonic welding, resistance welding, pressure diffusion welding, or soldering, etc.

Figure 7:
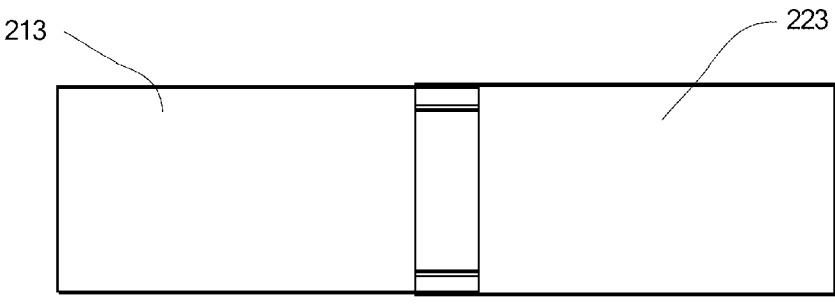
FIG. 7 illustrates a schematic diagram of a planar structure of shielding layers in symmetrical connection arrangement according to an embodiment of the present disclosure.
Figure 8:
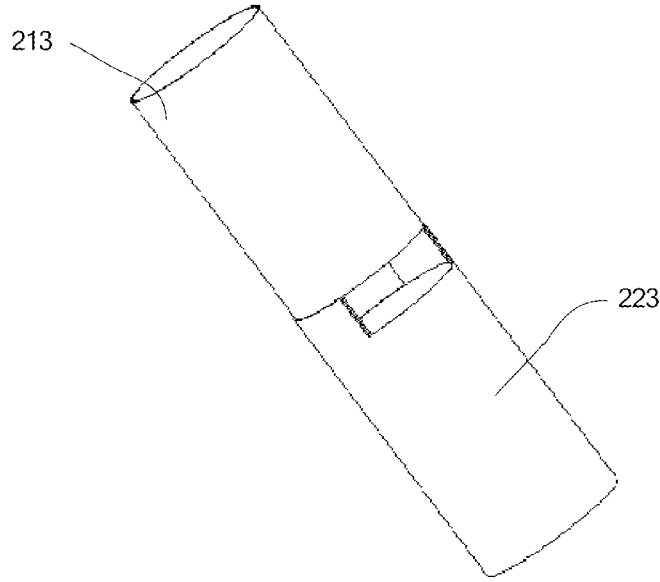
FIG. 8 illustrates a schematic diagram of a stereoscopic structure of shielding layers in symmetrical connection arrangement according to an embodiment of the present disclosure.

Referring to FIGS. 1, 7 and 8, specifically, connection positions between the first end of the conductive device 11 and the first shielding layer 213 are in a connection arrangement, and connection positions between the second end of the conductive device 11 and the second shielding layer 223 are in a symmetrical connection arrangement.

Figure 9:
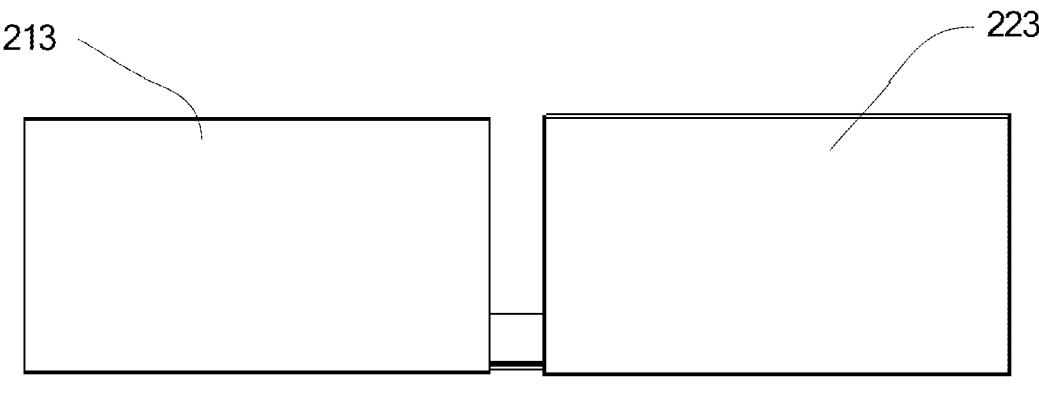
FIG. 9 illustrates a schematic diagram of a planar structure of shielding layers in asymmetrical connection arrangement according to an embodiment of the present disclosure.
Figure 10:
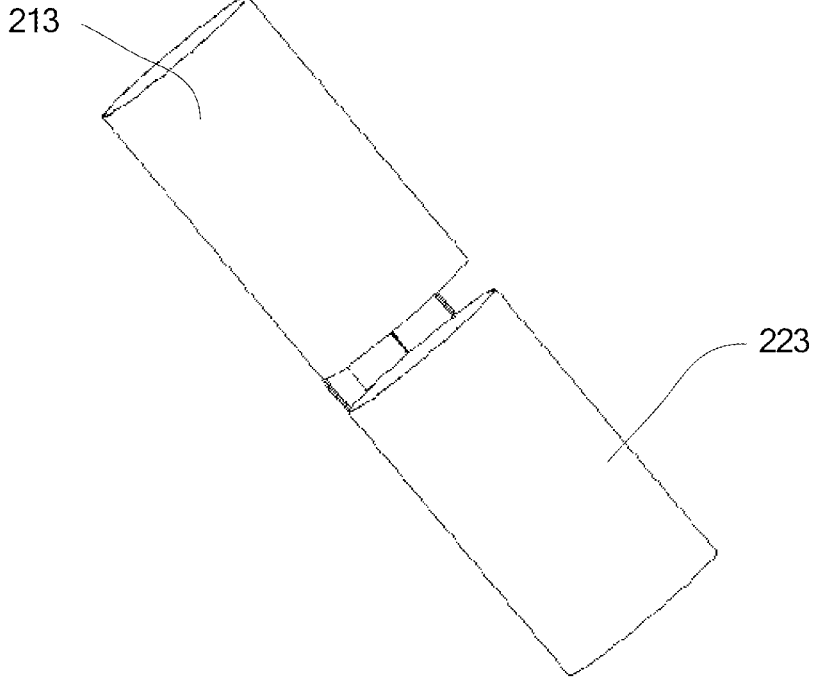
FIG. 10 illustrates a schematic diagram of a stereoscopic structure of shielding layers in asymmetrical connection arrangement according to an embodiment of the present disclosure.

Referring to FIGS. 9 and 10, if the connection position between the conductive device 11 and the shielding layer is a single spot, a large current will flow through the connection position to generate a magnetic field, which will be coupled with a magnetic field generated by the cable core, thereby causing a large radiation at the entire cable connection position, and seriously affecting the working condition of other electrical appliances. When the connection positions between the conductive device 11 and the shielding layer are symmetrical, the magnetic fields generated at the connection positions are in opposite directions and will offset each other to reduce the resultant magnetic field, thereby decreasing the radiation at the cable connection position, effectively reducing the magnetic field generated by the cable core and weaking the affection on other electrical appliances.

As an example, the connection position between the first end of the conductive device 11 and the first shielding layer 213 is in a 360° connection arrangement, i.e., the first end of the conductive device 11 is completely butted with a free end of the first shielding layer 213. The connection position between the second end of the conductive device 11 and the second shielding layer 223 is in a 360° connection arrangement, i.e., the second end of the conductive device 11 is completely butted with a free end of the second shield layer 223.

Compared with the symmetrical connection arrangement of the connection positions between the conductive device 11 and the shielding layer, the 360° connection arrangement of the connection position between the conductive device 11 and the shielding layer can greatly shield and offset the radiation generated by the cable core and the radiation generated by the shielding layer itself, so as to achieve an optimal shielding effect at the cable connection position.

The test method is as follows: a test instrument outputs a signal value (recorded as test value 2) to a first cable or a second cable, and a detection device is disposed outside the cable assembly to detect a signal value (recorded as test value 1). A shielding performance value=test value 2−test value 1.

Table 1 shows the influence of the arrangement of the connection position between the conductive device and the shielding layer on the shielding performance.

TABLE 1

| Test parameter | Arrangement of the connection position between the conductive device and the shielding layer | | |
| --- | --- | --- | --- |
| | Asymmetrical arrangement | Symmetrical arrangement | 360° arrangement |
| Shielding performance value (dB) | 48 | 63 | 75 |

The above table shows the data obtained by performing a test on a selected cable with a certain wire diameter. The standard requirement is that the shielding performance value of the connection position between the conductive device and the shielding layer is greater than 60 dB.

In a case where the connection positions between the conductive device and the shielding layer have a same size and are arranged asymmetrically, the shielding performance value thereof is less than 60 dB, which does not meet the standard requirement. When the connection positions are arranged symmetrically, even though the conductive device and the shielding layer are not completely connected, the shielding performance value thereof still meets the standard requirement since the electromagnetic radiation is offset. Exemplarily, when the connection position between the conductive device and the shielding layer is in a 360° connection arrangement, the shielding performance of the cable connection point is better.

During implementations, the structural forms of the components of the shielding connection assembly 10 may be various.

For example, the conductive device 11 may be a straight barrel structure with a uniform barrel diameter in a length direction thereof, or a barrel structure with non-uniform barrel diameters (e.g., gradually or locally increased).

In addition, a cross-section of the conductive device 11 may be a annular structure of circular, elliptical, polygonal or irregular shape. The cross-sectional shapes of the first end and the second end of the conductive device 11 may be the same or different. For example, the cross-sectional shapes of the first end and the second end of the conductive device 11 may both be circular; or, the cross-sectional shape of the first end of the conductive device 11 is circular, and the cross-sectional shape of the second end of the conductive device 11 is quadrilateral.

It can be understood that during implementations, the cross-sectional shape of the first end of the conductive device 11 may be adaptively adjusted and matched according to the cross-sectional shape of the first shielding layer 213, so as to improve the connection effect between the conductive device 11 and the first shielding layer 213. Correspondingly, the cross-sectional shape of the second end of the conductive device 11 may be adaptively adjusted and matched according to the cross-sectional shape of the second shielding layer 223, so as to improve the connection effect between the conductive device 11 and the second shielding layer 223. For example, when the cross-section of the second shielding layer 223 is circular ring shape, the cross-section of the second end of the conductive device 11 may also be circular ring shape, so that the attachment degree between the second shielding layer 223 and the conductive device 11 can be effectively improved.

During manufacturing, the conductive device 11 may be a barrel structure made of a conductive material such as copper or aluminum; or, the conductive device 11 may be a barrel structure woven with metal wires to obtain a certain flexibility, thereby enlarging application range and improving anti-vibration performance. The material and the manufacturing mode of the conductive device 11 are not limited in the present disclosure.

The cross-section of the first shielding internal device 12 may be an annular structure of circular, elliptical, polygonal or irregular shape, so that the application range of the shielding connection assembly can be effectively enlarged.

The cross-section of the first shielding external device 13 may be an annular structure of circular, elliptical, polygonal or irregular shape, so that the application range of the shielding connection assembly can be effectively enlarged The cross-sectional shapes of the first shielding internal device 12 and the first shielding external device 13 may be substantially the same, so as to ensure the effect of crimping, welding or abutment between the first shielding internal device 12 and the first shielding external device 13.

In addition, during implementations, since the first shielding layer 213 and the first end of the conductive device 11 are crimped or welded or abutted between the first shielding external device 13 and the first shielding internal device 12, in order to improve the crimping effect, the cross-sectional profiles of the first shielding layer 213, the first end of the conductive device 11, the first shielding internal device 12 and the first shielding external device 13 may be substantially the same.

During manufacturing, the first shielding internal device 12 may be made of a material such as copper or aluminum and shaped by a process such as cutting, stamping, etc. Correspondingly, the first shielding external device 13 may also be made of a material such as copper or aluminum and shaped by a process such as cutting, stamping, etc.

In addition, in some embodiments, in order to improve a pressing force or a fixing force between the first shielding internal device 12 and the first shielding external device 13, a structural strength of the first shielding internal device 12 may be greater than that of the first shielding external device 13, so that when the pressing force or the fixing force is applied to the first shielding external device 13, the first shielding internal device 12 will not be deformed obviously.

The material and the manufacturing mode of the second shielding internal device 14 may be similar to those of the first shielding internal device 12. Correspondingly, the material and the manufacturing mode of the second shielding external device 15 may be similar to those of the first shielding external device 13, which will not be described here.

In addition, during implementations, since the second shielding layer 223 and the second end of the conductive device 11 are crimped or welded or abutted between the second shielding external device 15 and the second shielding internal device 14, in order to improve the crimping effect, the cross-sectional profiles of the second shielding layer 223, the second end of the conductive device 11, the second shielding internal device 14 and the second shielding external device 15 may be substantially the same.

As illustrated in FIG. 2, in some embodiments, an inner insulation layer 111 may be provided on the inner wall of the conductive device 11, so as to prevent the conductive device 11 from short-circuiting with other components inside the conductive device 11. Meanwhile, in order to ensure the electrical connection between the inner wall of the conductive device 11 and the first shielding layer 213 and the second shielding layer 223, the first end and the second end of the conductive device are not provided with the internal insulation layer.

In addition, an outer insulation layer 112 may be provided on the outer wall of the conductive device 11, so as to prevent the conductive device 11 from short-circuiting with other components outside the conductive device 11. Meanwhile, in order to ensure the electrical connection between the outer wall of the conductive device 11 and the first shielding external device 13 and the second shielding external device 15, the first end and the second end of the conductive device are not provided with the external insulation layer.

The inner insulation layer 111 and the outer insulation layer 112 may be made of a material including one or more selected form the group consisting of polyvinyl chloride, polyurethane, nylon, polypropylene, silicone rubber, cross-linked polyolefin, synthetic rubber, polyurethane elastomer, cross-linked polyethylene and polyethylene, or may be made of any other material with a good electrical insulation performance, which is not limited in the present disclosure.

During applications, the shielding connection assembly 10 may be applied to the cables with shielding structures to effectively connect the shielding structures of two cables.

Figure 3:
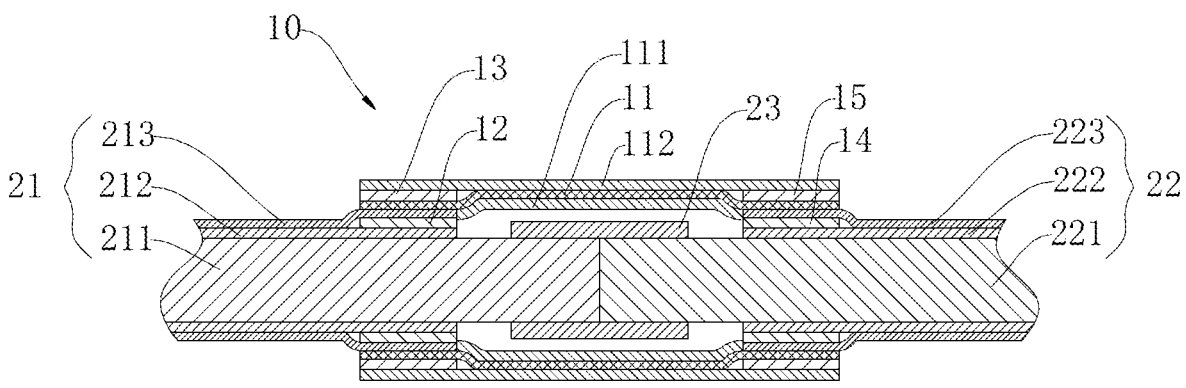
FIG. 3 illustrates a schematic diagram of a cross-sectional structure of a cable assembly according to an embodiment of the present disclosure.

For example, as illustrated in FIG. 3, an embodiment of the present disclosure further provides a cable assembly, including a first cable 21, a second cable 22 and a shielding connection assembly 10.

The first cable 21 includes a first cable core 211 and a first shielding layer 213. A first protective layer 212 is wrapped around an outer side of the first cable core 211, and the first shielding layer 213 is disposed on an outer side of the first protective layer 212.

The main function of the first cable core 211 is to transmit electric energy. In specific configurations, the first cable core 211 may be made of a material with good electrical conductivity such as copper or aluminum.

The first protective layer 212 is wrapped around an outer side of the first cable core 211, thereby providing a good protection for the first cable core 211. In specific configurations, the first protective layer 212 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene, thereby providing a good electrical insulation for the first cable core 211.

Correspondingly, the second cable 22 includes a second cable core 221 and a second shielding layer 223. A second protective layer 222 is wrapped around an outer side of the second cable core 221, and the second shielding layer 223 is disposed on an outer side of the second protective layer 222.

The main function of the second cable core 221 is to transmit electric energy. In specific configurations, the second cable core 221 may be made of a material with good electrical conductivity such as copper or aluminum.

The second protective layer 222 is wrapped around an outer side of the second cable core 221, thereby providing a good protection for the second cable core 221. In specific configurations, the second protective layer 222 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene, thereby providing a good electrical insulation for the second cable core 221.

In order to realize the electrical connection between the first cable 21 and the second cable 22, one end of the first cable core 211 is connected to one end of the second cable core 221.

During implementations, the first cable core 211 and the second cable core 221 may be lapped or butted, in which 'lap' means that the first cable core 211 and the second cable core 221 have overlapped areas, and 'butt' means that an end surface of the first cable core 211 is connected to an end surface of the second cable core 221.

During implementations, the first cable core 211 and the second cable core 221 may be connected by crimping, laser welding, ultrasonic welding, resistance welding, pressure diffusion welding, or soldering, etc.

For example, as illustrated in FIG. 3, in one embodiment provided by the present disclosure, the first cable core 211 and the second cable core 221 are connected by crimping. Specifically, an end face of the first cable core 211 is butted with an end face of the second cable core 221, and a crimping ring 23 is disposed on an outer side of a butt connection position between the first cable core 211 and the second cable core 221. The crimping ring 23 is pressed by a tool such as a crimping plier, so that the crimping ring 23 is firmly disposed on the outer side of the first cable core 211 and the second cable core 221, thereby realizing the conductive connection between the first cable core 211 and the second cable core 221.

In specific configurations, the crimping ring 23 may be made of a material with good electrical conductivity such as It can be understood that during implementations, the cross-sectional profiles of the first cable core 211 and the second cable core 221 may be the same or different. For example, the cross-sectional profiles of the first cable core 211 and the second cable core 221 may both be circular.

Alternatively, in other embodiments, the butt connection position between the first cable core 211 and the second cable core 221 may also be specially treated to increase the effective contact area therebetween, thereby improving the electrical connection performance between the first cable core 211 and the second cable core 221.

Figure 4:
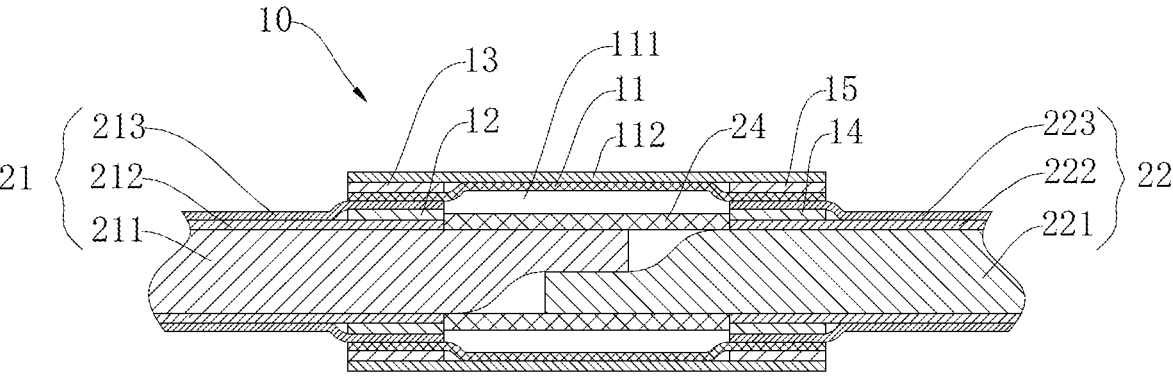
FIG. 4 illustrates a schematic diagram of a cross-sectional structure of another cable assembly according to an embodiment of the present disclosure.

For example, as illustrated in FIG. 4, in one embodiment provided by the present disclosure, the first cable core 211 and the second cable core 221 are connected by welding. Specifically, approximately half of a right end of the first cable core 211 is cut off from the cable core, thereby forming a large contact surface; and approximately half of a left end of the second cable core 221 is cut off from the cable core, thereby forming a large contact surface. Therefore, when the first cable core 211 and the second cable core 221 are welded, the first cable core 211 and the second cable core 221 can be partially overlapped, so as to increase the welding area between the first cable core 211 and the second cable core 221, thereby ensuring the connection effect between the first cable core 211 and the second cable core 221. A minimum cross-sectional area of a lapped connection position or a butted connection position between the first cable core 211 and the second cable core 221 may be greater than or equal to a smallest one of a cross-sectional area of the first cable core 211 and a cross-sectional area of the second cable core 221.

In other embodiments, the thicknesses of the first shielding layer 213, the second shielding layer 223 and the conductive device 11 may be 0.003 mm to 27 mm.

The test method is as follows: a test instrument outputs a signal value (recorded as test value 2) to a first cable or a second cable, and a detection device is disposed outside the cable assembly to detect a signal value (recorded as test value 1). A shielding performance value=test value 2−test value 1.

Table 2 shows an influence of thicknesses of the shielding layer and the conductive device on the shielding performance and the bending radius increment.

TABLE 2

| | Thickness of the shielding layer (mm) | | | | | | | | | | |
|---|---|---|---|---|---|---|---|---|---|---|---|
| Test parameter | 0.001 | 0.003 | 0.005 | 0.01 | 0.05 | 0.1 | 0.2 | 0.4 | 0.6 | 0.8 | 1 |
| Shielding performance value (dB) | 57 | 60.1 | 62.4 | 64.3 | 66.6 | 68.9 | 70.1 | 72.5 | 73.7 | 74.1 | 76.9 |
| Bending radius increment (mm) | 1 | 1.1 | 1.3 | 1.5 | 2 | 2.3 | 2.5 | 2.9 | 3.3 | 3.7 | 4 |

| | Thickness of the shielding layer (mm) | | | | | | | | | | |
|---|---|---|---|---|---|---|---|---|---|---|---|
| Test parameter | 3 | 5 | 10 | 15 | 20 | 25 | 26 | 27 | 28 | 29 | 30 |
| Shielding performance value (dB) | 78.5 | 80.1 | 82.6 | 85.1 | 87.9 | 90.5 | 93.2 | 95.5 | 95.6 | 95.6 | 95.8 |
| Bending radius increment (mm) | 5 | 6 | 9.5 | 15.5 | 77 | 178 | 183 | 189 | 211 | 231 | 253 | copper or aluminum, so as to improve the electrical connection performance between the first cable core 211 and the second cable core 221.

The above table shows the data obtained by performing a test on a selected cable with a certain wire diameter. The standard requirement is that the shielding performance value of the connection positions between the conductive device and the shielding layer is greater than 60 dB.

According to the test results shown in the table, when the thicknesses of the first shielding layer 213, the second shielding layer 223 and the conductive device 11 are 0.003 mm to 27 mm, the shielding performance of the first cable 21 and the second cable 22 increases along with the increase of the thickness. But when the thicknesses of the first shielding layer 213, the second shielding layer 223 and the conductive device 11 are greater than 27 mm, the shielding performance of the first cable 21 and the second cable 22 the drawing force between the first shielding internal device 12 or the second shielding internal device 14 and the first shielding layer 213 or the second shielding layer 223 cannot meet the standard requirement, and a breakage occurs, which leads to a degradation or a failure of the shielding performance, and even leads to a loss of the shielding function in severe cases.

Table 3 shows the influence of the connection area between the shielding internal device and the shielding layer on the drawing force therebetween.

TABLE 3

| Ratio of the outer surface area of connection between the shielding internal device and the shielding layer to the outer surface area of the shielding internal device (%) | | | | | | | | | | | | | | | |
|---|---|---|---|---|---|---|---|---|---|---|---|---|---|---|---|
| Ratio of the outer surface area of connection between the shielding internal device and the shielding layer to the outer surface area of the shielding internal device (%) | | | | | | | | | | | | | | | |
| 0.1 | 0.3 | 0.5 | 0.8 | 1 | 1.3 | 1.6 | 2 | 5 | 10 | 30 | 50 | 70 | 80 | 90 | 100 |
| Drawing force (N) between the shielding internal device and the shielding layer | | | | | | | | | | | | | | | |
| Breakage | Breakage | 12 | 15 | 31 | 51 | 72 | 88 | 101 | 124 | 156 | 164 | 172 | 179 | 182 | 194 | changes little without a significant increase. When the thicknesses of the first shielding layer 213, the second shielding layer 223 and the conductive device 11 are 0.003 mm to 27 mm, the bending radius increments of the first cable 21 and the second cable 22 increase along with the increase of the thickness. But when the thicknesses of the first shielding layer 213, the second shielding layer 223 and the conductive device 11 are greater than 27 mm, the bending radius increments of the first cable 21 and the second cable 22 increase by more than 200 mm, which is not conducive to the actual processing. Therefore, it is preferable that the thicknesses of the first shielding layer 213, the second shielding layer 223 and the conductive device 11 are 0.003 mm to 27 mm.

In addition, an outer surface area of connection between the first shielding internal device 12 the first shielding layer 213 is greater than 1.3% of an outer surface area of the first shielding internal device 12, thereby ensuring the connection effect between the first shielding internal device 12 and the first shielding layer 213.

In addition, an outer surface area of connection between the second shielding internal device 14 and the second shielding layer 223 is greater than 1.3% of an outer surface area of the second shielding internal device 14, thereby ensuring the connection effect between the second shielding internal device 14 and the second shielding layer 223. Specifically, the larger the connection area between the first shielding internal device 12 or the second shielding internal device 14 and the first shielding layer 213 or the second shielding layer 223, the better the mechanical property therebetween. In the use environment, a breakage will not occur under the external force as long as a drawing force between the first shielding internal device 12 or the second shielding internal device 14 and the first shielding layer 213 or the second shielding layer 223 meets the standard requirement. It is found, after many experiments and tests, that when the outer surface area of connection between the first shielding internal device 12 and the first shielding layer 213 is less than 1.3% of the outer surface area of the first shielding internal device 12, and the outer surface area of connection between the second shielding internal device 14 and the second shielding layer 223 is less than 1.3% of the outer surface area of the second shielding internal device 14, The above table shows the data obtained by performing a test on a selected cable with a certain wire diameter. The standard requirement is that the drawing force between the shielding internal device and the shielding layer is greater than 50 N.

In addition, an outer surface area of connection between the first shielding external device 13 and the first shielding layer 213 is greater than 1.4% of an outer surface area of the first shielding external device 13, thereby ensuring the connection effect between the first shielding external device 13 and the first shielding layer 213.

In addition, an outer surface area of connection between the second shielding external device 15 and the second shielding layer 223 is greater than 1.4% of an outer surface area of the second shielding external device 15, thereby ensuring the connection effect between the second shielding external device 15 and the second shielding layer 223.

Similarly, the larger the connection area between the first shielding external device 13 or the second shielding external device 15 and the first shielding layer 213 or the second shielding layer 223, the better the mechanical property therebetween. In the use environment, a breakage will not occur under the external force as long as a drawing force between the first shielding external device 13 or the second shielding external device 15 and the first shielding layer 213 or the second shielding layer 223 meets the standard requirement. It is found, after many experiments and tests, that when the outer surface area of connection between the first shielding external device 13 and the first shielding layer 213 is less than 1.4% of the outer surface area of the first shielding external device 13, and the outer surface area of connection between the second shielding external device 15 and the second shielding layer 223 is less than 1.4% of the outer surface area of the second shielding external device 15, the drawing force between the first shielding external device 13 or the second shielding external device 15 and the first shielding layer 213 or the second shielding layer 223 cannot meet the standard requirement, and a breakage occurs, which leads to a degradation or a failure of the shielding performance, and even leads to a loss of the shielding function in severe cases.

Table 4 shows the influence of the connection area between the shielding external device and the shielding layer on the drawing force therebetween.

TABLE 4

| Ratio of the outer surface area of connection between the shielding external device and the shielding layer to the outer surface area of the shielding external device (%) | | | | | | | | | | | | | | | |
|---|---|---|---|---|---|---|---|---|---|---|---|---|---|---|---|
| 0.1 | 0.3 | 0.5 | 0.8 | 1 | 1.4 | 1.6 | 2 | 5 | 10 | 30 | 50 | 70 | 80 | 90 | 100 |
| Drawing force (N) between the shielding external device and the shielding layer | | | | | | | | | | | | | | | |
| Breakage | Breakage | 14 | 17 | 29 | 52 | 76 | 83 | 98 | 121 | 158 | 162 | 176 | 173 | 185 | 197 |

The above table shows the data obtained by performing a test on a selected cable with a certain wire diameter. The standard requirement is that the drawing force between the shielding external device and the shielding layer is greater than 50 N.

In addition, a minimum cross-sectional area of the connecting position between the first end of the conductive device 11 and the first shielding layer 213 is 60% to 260% of the cross-sectional area of the first shielding layer, thereby ensuring the connection effect between the first end of the conductive device 11 and the first shielding layer 213.

In addition, a minimum cross-sectional area of the connection position between the second end of the conductive device 11 and the second shielding layer 223 is 60% to 260% of the cross-sectional area of the second shielding layer, thereby ensuring the connection effect between the second end of the conductive device 11 and the second shielding layer 223.

The main function of the first shielding layer 213 and the second shielding layer 223 is to ground the eddy current generated by the current-conducted cable core to avoid the electromagnetic interference. When the minimum cross-sectional area of the connection position between the first end of the conductive device 11 and the first shielding layer 213 or between the second end of the conductive device 11 and the second shielding layer 223 is less than the standard requirement, local heat will be generated at the cable shielding connection position, and in severe cases, the connection position between the conductive device 11 and the first shielding layer 213 and the second shielding layer 223 will be burned, resulting in degradation or failure of the cable shielding performance.

Table 5 shows the influence of a ratio of the minimum cross-sectional area of the connection position between the conductive device and the first shielding layer to the cross-sectional area of the first shielding layer on a temperature rise value between the conductive device and the shielding layer.

TABLE 5

| Ratio of the minimum cross-sectional area of the connection position between the conductive device and the first shielding layer to the cross-sectional area of the first shielding layer (%) | | | | | | | | | | | | | | | |
|---|---|---|---|---|---|---|---|---|---|---|---|---|---|---|---|
| 20 | 40 | 60 | 80 | 100 | 120 | 140 | 160 | 180 | 200 | 220 | 240 | 260 | 280 | 300 | 320 |
| Temperature rise value between the conductive device and the first shielding layer (° C.) | | | | | | | | | | | | | | | |
| 63 | 57 | 49 | 47 | 45 | 42 | 38 | 35 | 31 | 29 | 27 | 24 | 20 | 22 | 21 | 20 |

Table 6 shows the influence of a ratio of the minimum cross-sectional area of the connection position between the conductive device and the second shielding layer to the cross-sectional area of the second shielding layer on a temperature rise value between the conductive device and the shielding layer.

TABLE 6

| Ratio of the minimum cross-sectional area of the connection position between the conductive device and the second shielding layer to the cross-sectional area of the second shielding layer (%) | | | | | | | | | | | | | | | |
|---|---|---|---|---|---|---|---|---|---|---|---|---|---|---|---|
| 20 | 40 | 60 | 80 | 100 | 120 | 140 | 160 | 180 | 200 | 220 | 240 | 260 | 280 | 300 | 320 |
| Temperature rise value between the conductive device and the second shielding layer (° C.) | | | | | | | | | | | | | | | |
| 65 | 58 | 48 | 46 | 44 | 41 | 37 | 35 | 30 | 28 | 26 | 23 | 21 | 21 | 20 | 21 |

The above table shows the data obtained by performing a test on a selected cable with a certain wire diameter. The standard requirement is that the temperature rise value between the conductive device and the shielding layer is less than 50° C.

As can be seen from the above table, when the minimum cross-sectional area of the connection position between the first end of the conductive device 11 and the first shielding layer 213 or between the second end of the conductive device 11 and the second shielding layer 223 is less than 60% of the cross-sectional area of the first shielding layer or the second shielding layer, the temperature rise values between the conductive device 11 and the first shielding layer 213 and between the conductive device 11 and the second shielding layer 223 do not meet the standard requirement.

When the ratio of the minimum cross-sectional area of the connection position between the first end of the conductive device 11 and the first shielding layer 213 or between the second end of the conductive device 11 and the second shielding layer 223 to the cross-sectional area of the first shielding layer or the second shielding layer is more than 260%, as the cross-sectional areas of the connection positions between the conductive device 11 and the first shielding layer 213 and between the conductive device 11 and the second shielding layer 223 are already much larger than a minimum conduction area of the eddy current, the temperature rise values between the conductive device 11 and the first shielding layer 213 and between the conductive device 11 and the second shielding layer 223 are the same as that when the ratio is 260%, but the spent cost and the processing cycle are increased.

Therefore, it is preferable that the minimum cross-sectional area of the connection position between first end of the conductive device 11 and the first shielding layer 213 is 60% to 260% of the cross-sectional area of the first shielding layer 213, and the minimum cross-sectional area of the connection position between the second end of the conductive device 11 and the second shielding layer 223 is 60% to 260% of the cross-sectional area of the second shielding layer 223.

Specifically, an impedance of the connection position between the first end of the conductive device and the first shielding layer is less than 13.7 mΩ, and an impedance of the connection position between the second end of the conductive device and the second shielding layer is less than 13.7 mΩ.

Exemplarily, the impedance of the connection position between the first end of the conductive device and the first shielding layer is less than 12.5 mΩ, and the impedance of the connection position between the second end of the conductive device and the second shielding layer is less than 12.5 mΩ.

The impedance of the connection position between the conductive device and the shielding layer should be as small as possible, so that the current generated by the shielding layer can flow back to an energy source or a grounded position without hindrance. If the impedance of the connection position between the conductive device and the shielding layer is large, large current will be generated at the connection position between the conductive device and the shielding layer, thereby causing a large radiation at the cable connection position.

The test method is as follows: a test instrument outputs a signal value (recorded as test value 2) to a first cable or a second cable, and a detection device is disposed outside the cable assembly to detect a signal value (recorded as test value 1). A shielding performance value=test value 2–test value 1.

Table 7 shows the influence of the impedance of the connection position between the conductive device and the shielding layer on the shielding performance.

position between the conductive device and the shielding layer is less than 60 dB, which does not meet the standard requirement. Moreover, when the impedance of the connection position between the first end of the conductive device and the first shielding layer is less than 12.5 mΩ, and the impedance of the connection position between the second end of the conductive device and the second shielding layer is less than 12.5 mΩ, the shielding performance value of the connection position between the conductive device and the shielding layer changes little. Therefore, the inventor sets the impedance of the connection position between the first end of the conductive device and the first shielding layer to be less than 13.7 mΩ, and the impedance of the connection position between the second end of the conductive device and the second shielding layer to be less than 13.7 mΩ.

Exemplarily, the impedance of the connection position between the first end of the conductive device and the first shielding layer is less than 12.5 mΩ, and the impedance of the connection position between the second end of the conductive device and the second shielding layer is less than 12.5 mΩ.

In alternative embodiments, in order to provide a good protection for the connection position between the first cable core 211 and the second cable core 221, in the embodiments provided by the present disclosure, an isolation device 24 is further disposed on an outer side of the connection position between the first cable core 211 and the second cable core 221.

In specific configurations, the isolation device 24 may be a heat shrinkable tube, or be made of an insulation material including one or more selected from the group consisting of polyvinyl chloride, polyurethane, nylon, polypropylene, silicone rubber, cross-linked polyolefin, synthetic rubber, polyurethane elastomer, cross-linked polyethylene and polyethylene, and injection molded on an outer side of the butt connection position. A left end of the isolation device 24 may be connected to the first protective layer 212 of the first cable 21, and a right end of the isolation device 24 may be connected to the second protective layer 222 of the second cable 22, so as to well protect the first cable core 211 and the second cable core 221.

Figure 5:
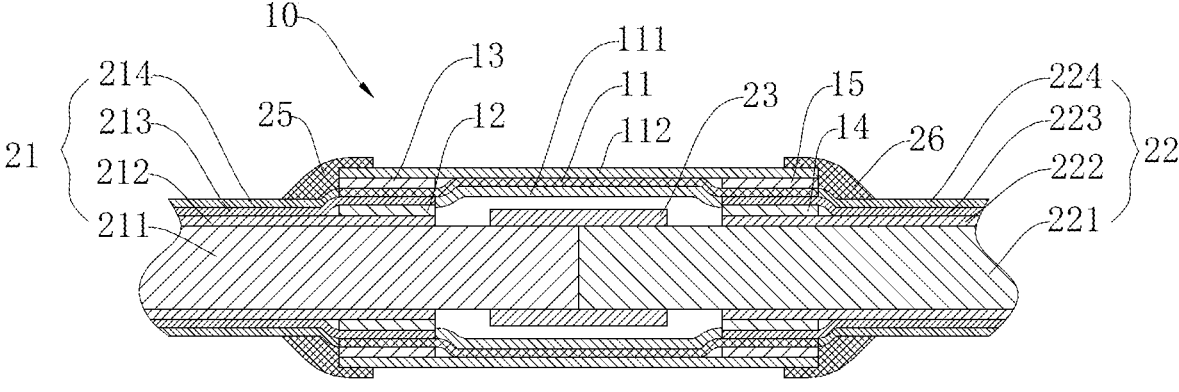
FIG. 5 illustrates a schematic diagram of a cross-sectional structure of still another cable assembly according to an embodiment of the present disclosure.
Figure 6:
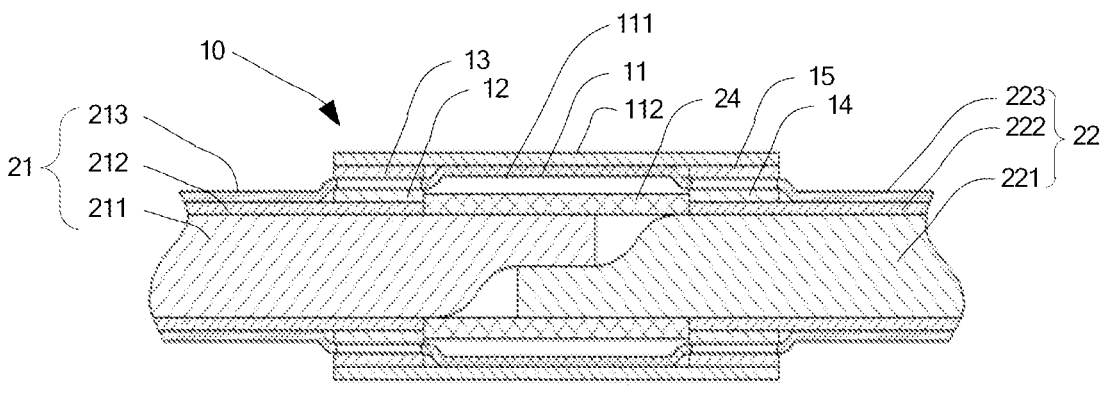
FIG. 6 illustrates a schematic diagram of a cross-sectional structure of yet still another cable assembly according to an embodiment of the present disclosure.

As illustrated in FIGS. 5 and 6, in practical applications, the first cable 21 may generally include a third protective layer 214 (which may also be understood as an outer cover),

TABLE 7

| Test | Impedance (mΩ) of the connection position between the conductive device and the shielding layer | | | | | | | | | | |
|---|---|---|---|---|---|---|---|---|---|---|---|
| parameter | 9.1 | 9.7 | 10.1 | 11.3 | 11.9 | 12.5 | 13.1 | 13.7 | 14.3 | 14.9 | 15.5 |
| Shielding performance value (dB) | 72 | 71 | 70 | 71 | 70 | 69 | 65 | 61 | 53 | 49 | 43 |

The above table shows the data obtained by performing a test on a selected cable with a certain wire diameter. The standard requirement is that the shielding performance value of the connection position between the conductive device and the shielding layer is greater than 60 dB.

When the impedance of the connection position between the first end of the conductive device and the first shielding layer is greater than 13.7 mΩ, and the impedance of the connection position between the second end of the conductive device and the second shielding layer is greater than 13.7 mΩ, the shielding performance value of the connection and the second cable 22 may generally include a fourth protective layer 224 (which may also be understood as an outer cover).

Specifically, the third protective layer 214 is disposed on an outer side of the first shielding layer 213 to prevent the first shielding layer 213 from being in conductive contact with other components, thereby improving the use safety of the first cable 21, and further improving the overall waterproof and dustproof performance of the first cable 21.

During implementations, the third protective layer 214 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene.

Correspondingly, in the second cable 22, the fourth protective layer 224 is disposed on an outer side of the second shielding layer 223 to prevent the second shielding layer 223 from being in conductive contact with other components, thereby improving the use safety of the second cable 22, and further improving the overall waterproof and dustproof performance of the second cable 22.

During implementations, the fourth protective layer 224 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene.

In addition, as illustrated in FIGS. 5 and 6, the embodiments provided by the present disclosure further include a first sealing member 25 and a second sealing member 26. During applications, the first sealing member 25 and the second sealing member 26 may be made of an insulation material including one or more selected from the group consisting of polyvinyl chloride, polyurethane, nylon, polypropylene, silicone rubber, crosslinked polyolefin, synthetic rubber, polyurethane elastomer, crosslinked polyethylene and polyethylene.

The first sealing member 25 is used for hermetically connecting the third protective layer 214 and the outer insulation layer 112 to prevent impurities such as moisture and dust from entering the first cable 21 from the connection position between the shielded connecting assembly 10 and the first cable 21. The second sealing member 26 is used for hermetically connecting the fourth protective layer 224 and the outer insulation layer 112, so as to prevent impurities such as moisture and dust from entering the second cable 22 from the connection position between the shielded connecting assembly 10 and the second cable 22, thereby effectively ensuring the hermeticity of the whole cable assembly.

The first sealing member 25 may be directly formed on outer sides of the third protective layer 214 and the outer insulation layer 112 by a process such as injection molding or dispensing. Alternatively, the first sealing member 25 may be a pre-formed structural member, and then fixed on the outer sides of the third protective layer 214 and the outer insulation layer 112 by a process such as adhesive bonding.

Correspondingly, the second sealing member 26 may be directly formed on outer sides of the fourth protective layer 224 and the outer insulation layer 112 by a process such as injection molding or dispensing. Alternatively, the second sealing member 26 may be a pre-formed structural member, and then fixed on the outer sides of the fourth protective layer 224 and the outer insulation layer 112 by a process such as adhesive bonding.

The manner of forming the first sealing member 25 and the manner of connecting the first sealing member 25 with the third protective layer 214 and the outer insulation layer 112 are not limited in the present disclosure. Correspondingly, the manner of forming the second sealing member 26 and the manner of connecting the second sealing member 26 with the fourth protective layer 224 and the outer insulation layer 112 are not limited in the present disclosure.

When the cable assembly is to be prepared, the following steps may be adopted:

Referring to FIGS. 5 and 11, the method may include:

S10: providing a first cable 21, which includes a first cable core 211, a first protective layer 212 and a first shielding layer 213; the first protective layer 212 is disposed on an outer side of the first cable core 211, and the first shielding layer 213 is disposed on an outer side of the first protective layer 212.

S11: peeling off the first shielding layer 213 and the first protective layer 212 at a first end of the first cable 21 (a right end of the first cable 21 in FIG. 5) to expose the first cable core 211.

S20: providing a second cable 22, which includes a second cable core 221, a second protective layer 222 and a second shielding layer 223; the second protective layer 222 is disposed on an outer side of the second cable core 221, and the second shielding layer 223 is disposed on an outer side of the second protective layer 222.

S21: peeling off the second shielding layer 223 and the second protective layer 222 at a first end of the second cable 22 (a left end of the second cable 22 in FIG. 5) to expose the second cable core 221.

S22: connecting a first end of the first cable core 211 and a first end of the second cable core 221 to realize an electrical connection between the first cable core 211 and the second cable core 221.

S30: providing a shielding connection assembly 10, which includes a conductive device 11, a first shielding internal device 12, a first shielding external device 13, a second shielding internal device 14 and a second shielding external device 15.

S31: disposing the first shielding internal device 12 on an inner side of the first shielding layer 213 and disposing the second shielding internal device 14 on an inner side of the second shielding layer 223.

S32: disposing a first end of the conductive device 11 on an outer side of the first shielding layer 213 and disposing a second end of the conductive device 11 on an outer side of the second shielding layer 223, so as to realize a connection between the first shielding layer 213 and the second shielding layer 223.

S33: disposing the first shielding external device 13 on an outer side of the first end of the conductive device 11 and disposing the second shielding external device 15 on an outer side of the second end of the conductive device 11.

It can be understood that during implementations, the first shielding external device 13 may be disposed on the outer side of the first end of the conductive device 11 in advance, and then the first end of the conductive device 11 may be disposed on the outer side of the first shielding layer 213. Correspondingly, the second shielding external device 15 may be disposed on the outer side of the second end of the conductive device 11 in advance, and then the second end of the conductive device 11 may be disposed on the outer side of the second shielding layer 223.

S34: welding the first end of the conductive device 11 and the first shielding layer 213 between the first shielding internal device 12 and the first shielding external device 13, and welding the second end of the conductive device 11 and the second shielding layer 223 between the second shielding internal device 14 and the second shielding external device 15; or, crimping the first end of the conductive device 11 and the first shielding layer 213 between the first shielding internal device 12 and the first shielding external device 13, and crimping the second end of the conductive device 11 and the second shielding layer 223 between the second shielding internal device 14 and the second shielding external device 15; alternatively, abutting the first end of the conductive device 11 and the first shielding layer 213 between the first shielding internal device 12 and the first shielding external device 13, and abutting the second end of the conductive device 11 and the second shielding layer 223 between the second shielding internal device 14 and the second shielding external device 15.

During welding, laser welding, ultrasonic welding, resistance welding, pressure diffusion welding, soldering, etc. may be adopted to weld the conductive device 11 with the first shielding layer 213, weld the first shielding layer 213 with the first shielding internal device 12, and weld the conductive device 11 with the first shielding external device 13. Correspondingly, laser welding, ultrasonic welding, resistance welding, pressure diffusion welding, or soldering, etc. may also be adopted to weld the conductive device 11 with the second shielding layer 223, weld the second shielding layer 223 with the second shielding internal device 14, and weld the conductive device 11 with the second shielding external device 15.

During crimping, a tool such as a crimping plier may be adopted to exert a force on the first shielding external device 13 and the second shielding external device 14, so as to realize a crimping connection between the first shielding external device 13 and the first shielding internal device 12, and a crimping connection between the second shielding external device 15 and the second shielding internal device 14.

In this process, since the first shielding embedding device 12 has a certain strength, it can protect the first cable core 211 and prevent the first cable core 211 from being obviously extruded. Correspondingly, since the second shielding embedding device 14 has a certain strength, it can protect second cable core 221 and prevent the second cable core 221 from being obviously extruded.

In step S22, connecting the first end of the first cable core 211 and the first end of the second cable core 221 specifically includes: connecting the first end of the first cable core 211 and the first end of the second cable core 221 by welding or crimping.

It can be understood that during implementations, the first cable core 211 may also be connected to the second cable core 221 in other ways so as to realize a conductive connection and a mechanical connection between the first cable core 211 and the second cable core 221.

In addition, before step S32, the method further includes: disposing an isolation device 24 on an outer side of the connection position between the first cable core 211 and the second cable core 221, so as to prevent undesirable conditions such as the conductive contact between the connection position and the conductive device 11.

The isolation device 24 may be a heat shrinkable tube, or any other insulation layers directly injection-molded on the outer side of the connection position.

In addition, in some embodiments, when a third protective layer 214 is disposed on the outer side of the first cable 21, step S11 further includes peeling off the third protective layer 214 of the first cable 21. Correspondingly, when a fourth protective layer 224 is disposed on the outer side of the second cable 22, step S21 further includes peeling off the fourth protective layer 224 of the second cable 22.

t can be understood that when the cable assembly is prepared, the manufacturing sequence may be adjusted adaptively according to the actual situation, and some steps may be added or omitted, which is not limited in the present disclosure.

Obviously, various modifications and variations can be made to the present disclosure by those skilled in the art without departing from the spirit and scope of the present disclosure. Thus, if these modifications and variations to the present disclosure fall within the scope of the claims of the present disclosure and their technical equivalents, the present disclosure is intended to include these modifications and variations.

What is claimed is:

1. A shielding connection assembly for connecting a first shielding layer and a second shielding layer, wherein the shielding connection assembly comprises:

a conductive device having a first end connected to the first shielding layer and a second end connected to the second shielding layer;

a first shielding internal device disposed on an inner side of the first shielding layer;

a first shielding external device disposed on an outer side of the first end, wherein the first end of the conductive device and the first shielding layer are pressed or welded or abutted between the first shielding internal device and the first shielding external device;

a second shielding internal device disposed on an inner side of the second shielding layer; and a second shielding external device disposed on an outer side of the second end, wherein the second end of the conductive device and the second shielding layer are pressed or welded or abutted between the second shielding internal device and the second shielding external device, wherein:

the first shielding internal device is disposed separately from the first shielding external device;

an outer wall of the first shielding internal device is attached to an inner wall of the first shielding layer;

the second shielding internal device is disposed separately from the second shielding external device;

an outer wall of the second shielding internal device is attached to an inner wall of the second shielding layer;

a structural strength of the first shielding internal device is greater than that of the first shielding external device;

an inner wall of the conductive device is provided with an inner insulation layer, and the inner insulation layer is spaced apart from components located on an inner side of the conductive device;

the first end and the second end of the conductive device are not provided with the inner insulation layer, and wherein the inner insulation layer is spaced apart from components on the inner side of the conductive device comprises: an annular space is provided on the inner side of the inner insulation layer, to separates the inner insulation layer from any of the components located on the inner side of the inner insulation layer.

2. The shielding connection assembly according to claim 1, wherein a connection position between the first end of the conductive device and the first shielding layer is in a symmetrical connection arrangement or a 360° connection arrangement, and wherein a connection position between the second end of the conductive device and the second shielding layer is in a symmetrical connection arrangement or a 360° connection arrangement.

3. The shielding connection assembly according to claim 1, wherein an outer wall of the conductive device is provided with an outer insulation layer, and wherein the first end and the second end of the conductive device are not provided with the outer insulation layer.

4. A cable assembly, comprising a first cable and a second cable, wherein:

the first cable comprises a first cable core and a first shielding layer, a first protective layer is wrapped around an outer side of the first cable, and the first shielding layer is disposed on an outer side of the first protective layer;

the second cable comprises a second cable core and a second shielding layer, a second protective layer is wrapped around an outer side of the second cable core, and the second shielding layer is disposed on an outer side of the second protective layer;

a first end of the first cable core is connected to a first end of the second cable core; and the cable assembly further comprises the shielding connection assembly according to claim 1.

5. The cable assembly according to claim 4, wherein the first cable core is lapped or butted with the second cable core.

6. The cable assembly according to claim 5, wherein a minimum cross-sectional area of a lapped or butted position is greater than or equal to a smallest one of a cross-sectional area of the first cable core and a cross-sectional area of the second cable core.

7. The cable assembly according to claim 4, wherein a thickness of the first shielding layer, or the second shielding layer or the conductive device is between 0.003 mm and 27 mm.

8. The cable assembly according to claim 4, wherein an outer surface area of connection between the first shielding internal device and the first shielding layer is greater than 1.3% of an outer surface area of the first shielding internal device, and wherein an outer surface area of connection between the second shielding internal device and the second shielding layer is greater than 1.3% of an outer surface area of the second shielding internal device.

9. The cable assembly according to claim 4, wherein an outer surface area of connection between the first shielding external device and the first shielding layer is greater than 1.4% of an outer surface area of the first shielding external device, and wherein an outer surface area of connection between the second shielding external device and the second shielding layer is greater than 1.4% of an outer surface area of the second shielding external device.

10. The cable assembly according to claim 4, wherein a minimum cross-sectional area of a connection position between the first end of the conductive device and the first shielding layer is 60% to 260% of a cross-sectional area of the first shielding layer, and wherein a minimum cross-sectional area of a connection position between the second end of the conductive device and the second shielding layer is 60% to 260% of a cross-sectional area of the second shielding layer.

11. The cable assembly according to claim 4, wherein an impedance of a connection position between the first end of the conductive device and the first shielding layer is less than 13.7 mΩ, and an impedance of a connection position between the second end of the conductive device and the second shielding layer is less than 13.7 mΩ.

12. The cable assembly according to claim 4, further comprising an isolation device, wherein the isolation device is disposed on an outer side of the first end of the first cable core and on an outer side of the first end of the second cable core.

13. The cable assembly according to claim 12, wherein one end of the isolation device is connected to the first protective layer, and the other end of the isolation device is connected to the second protective layer.

14. The cable assembly according to claim 4, wherein the first cable further comprises a third protective layer and the second cable further comprises a fourth protective layer, wherein the third protective layer is disposed on an outer side of the first shielding layer, and wherein the fourth protective layer is disposed on an outer side of the second shielding layer.

15. The cable assembly according to claim 14, wherein:

when an outer insulation layer is provided on an outer wall of the conductive device, the cable assembly further comprises a first sealing member and a second sealing member;

the first sealing element is capable of hermetically connecting the third protective layer and the outer insulation layer; and the second sealing element is capable of hermetically connecting the fourth protective layer and the outer insulation layer.

16. A method for preparing a cable assembly, comprising:

providing a first cable, which comprises a first cable core, a first protective layer and a first shielding layer, wherein the first protective layer is disposed on an outer side of the first cable core, and the first shielding layer is disposed on an outer side of the first protective layer;

peeling off the first shielding layer and the first protective layer at a first end of the first cable to expose the first cable core;

providing a second cable, which comprises a second cable core, a second protective layer and a second shielding layer, wherein the second protective layer is disposed on an outer side of the second cable core, and the second shielding layer is disposed on an outer side of the second protective layer;

peeling off the second shielding layer and the second protective layer at a first end of the second cable to expose the second cable core;

connecting a first end of the first cable core and a first end of the second cable core;

providing a shielding connection assembly, wherein the shielding connection assembly comprises a conductive device, a first shielding internal device, a first shielding external device disposed separately from the first shielding internal device, a second shielding internal device and a second shielding external device disposed separately from the second shielding internal device, wherein a structural strength of the first shielding internal device is greater than that of the first shielding external device;

disposing the first shielding internal device on an inner side of the first shielding layer so that an outer wall of the first shielding internal device is attached to an inner wall of the first shielding layer;

disposing the second shielding internal device on an inner side of the second shielding layer so that an outer wall of the second shielding internal device is attached to an inner wall of the second shielding layer;

disposing a first end of the conductive device on an outer side of the first shielding layer, and disposing a second end of the conductive device on an outer side of the second shielding layer;

disposing the first shielding external device on an outer side of the first end of the conductive device;

disposing the second shielding external device on an outer side of the second end of the conductive device;

welding the first end of the conductive device and the first shielding layer between the first shielding internal device and the first shielding external device, and welding the second end of the conductive device and the second shielding layer between the second shielding internal device and the second shielding external device; or, crimping the first end of the conductive device and the first shielding layer between the first shielding internal device and the first shielding external device, and crimping the second end of the conductive device and the second shielding layer between the second shielding internal device and the second shielding external device; or, abutting the first end of the conductive device and the first shielding layer between the first shielding internal device and the first shielding external device, and abutting the second end of the conductive device and the second shielding layer between the second shielding internal device and the second shielding external device; and providing an inner insulation layer on an inner wall of the conductive device, and not providing the inner insulation layer on the first end and the second end of the conductive device, wherein the inner insulation layer is spaced apart from components located on the inner side of the conductive device, to form an annular space on the inner side of the inner insulation layer that separates the inner insulation layer from any of the components located on the inner side of the inner insulation layer.

17. The method according to claim 16, wherein before the step of disposing an end of the conductive device on the outer side of the first shielding layer and disposing the other end of the conductive device on the outer side of the second shielding layer, the method further comprises disposing an isolation device on an outer side of a connection position between the first cable core and the second cable core.

* * * * *